Nov. 9, 1965  J. SUNNEN  3,216,266
CHANGE SPEED DEVICE
Filed April 12, 1963  3 Sheets-Sheet 1

INVENTOR:
JOSEPH SUNNEN
BY Charles B. Haverstick
ATTORNEY

Nov. 9, 1965     J. SUNNEN     3,216,266
CHANGE SPEED DEVICE
Filed April 12, 1963     3 Sheets-Sheet 2
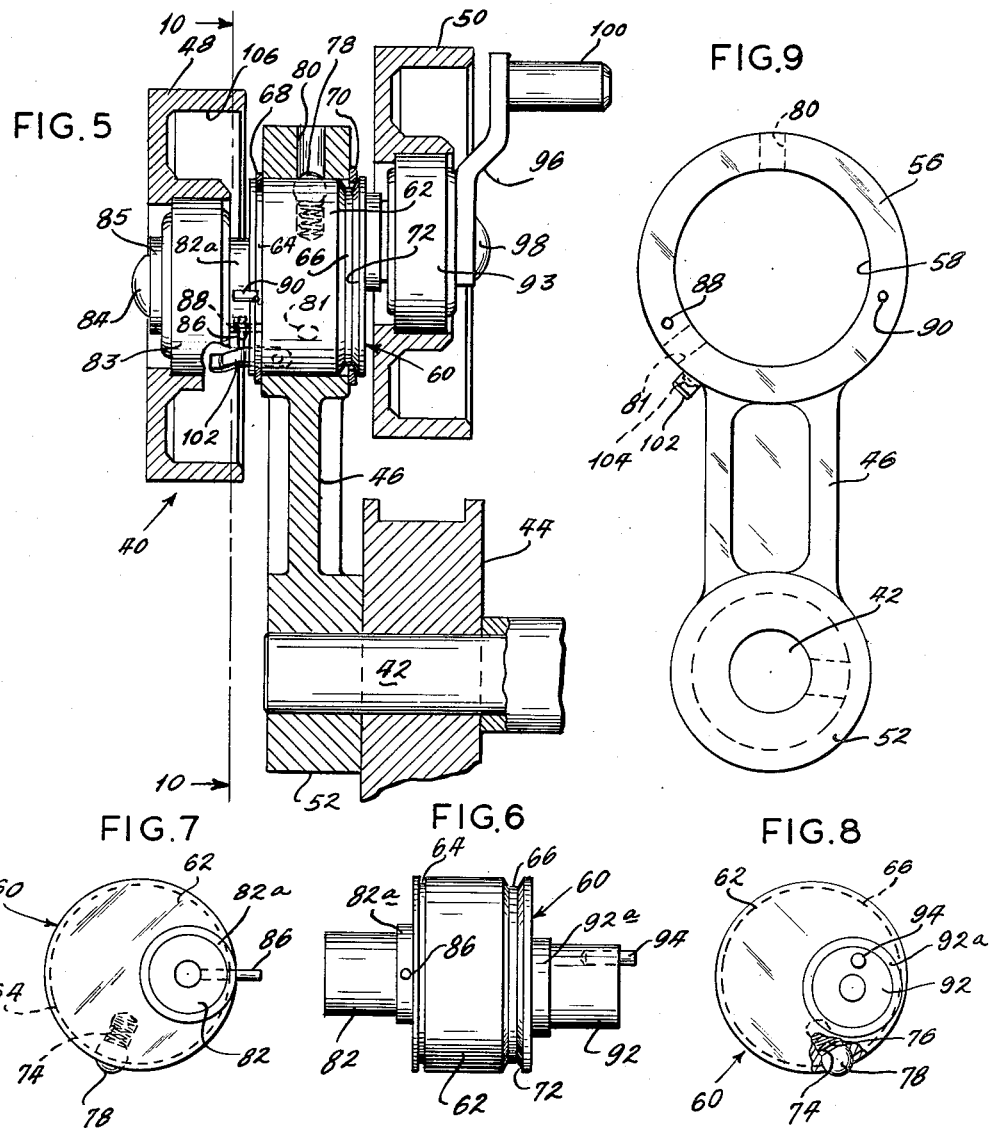
INVENTOR:
JOSEPH SUNNEN
BY
ATTORNEY Nov. 9, 1965  J. SUNNEN  3,216,266
CHANGE SPEED DEVICE
Filed April 12, 1963  3 Sheets-Sheet 3
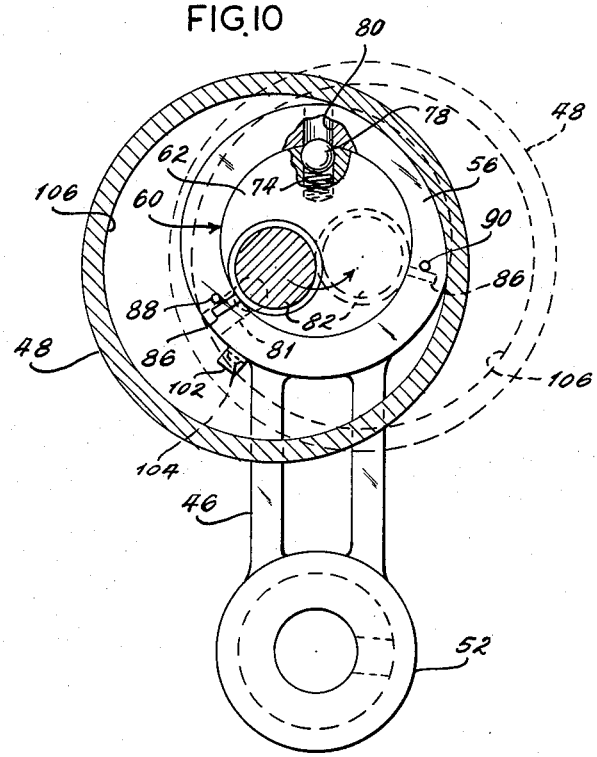
INVENTOR:
JOSEPH SUNNEN
BY Charles B. Haverstock
ATTORNEY United States Patent Office 3,216,266
Patented Nov. 9, 1965

3,216,266
CHANGE SPEED DEVICE
Joseph Sunnen, 400 S. Warson Road, Clayton, Mo.
Filed Apr. 12, 1963, Ser. No. 272,665
16 Claims. (Cl. 74—217)

The present invention relates generally to drive means and the like and more particularly to means for changing the driving speed.

In order to increase the flexibility and utility of power driven devices it is often necessary to provide a greater range or number of speeds. Many devices have been constructed and used for this purpose. For the most part, however, the known speed changing devices have been complicated to make and difficult to use, and have required frequent maintenance, repair and adjustment. Furthermore, the known devices do not provide a wide enough variation of speed for many applications, and the known devices also take too much time to operate for many applications.

These and other shortcomings and disadvantages of the known devices are overcome by the present device which teaches the construction and operation of a change speed device comprising drive means including a driving member, a driven member, at least two flexible drive connection means therebetween, each of said drive connection means being capable of producing a different speed ratio between the driving and the driven member, means for selectively loading said drive connection means to effect changes in the speed of the driven member, said last named means including a pair of idler members engageable respectively with different ones of said flexible drive connection means, and means for simultaneously moving said idler members between alternate operative positions wherein one of said connection means is loaded while the other connection means is unloaded.

A main object of the present invention is to increase the flexibility and utility of power driven machines and the like.

Another important object is to increase the number of speeds and speed ranges available to a driven member.

Another object is to provide relatively simple and inexpensive means for changing the speed and range of speed of a driven member.

Another object is to provide speed change means which are quick operating and can be operated without requiring special skill.

Another object is to prevent creeping and other undesirable movements of non-loaded drive connections.

Still another object is to provide change speed means which can be installed on new and existing equipment with a minimum of change.

These and other objects and advantages of the present invention will become apparent after considering the following detailed specification of a preferred embodiment in conjunction with the accompanying drawings wherein:

FIG. 5 is an enlarged fragmentary cross-sectional view taken on line 5—5 of FIG. 1;

FIG. 6 is an enlarged side elevational view of the movable change speed member of the subject device;

FIG. 7 is a left end view of the change speed member of FIG. 6;

FIG. 8 is a right end view of the change speed member of FIG. 6;

FIG. 9 is a side view of the movable arm associated with the subject change speed device; and FIG. 10 is an enlarged fragmentary cross-sectional view taken on line 10—10 of FIG. 5.

Figure 1:
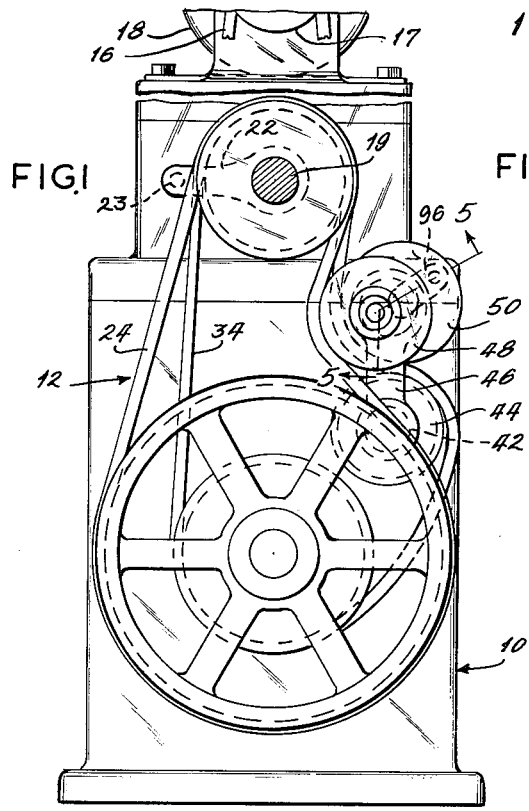
FIG. 1 is a rear elevational view of a machine having drive means equipped with change speed means constructed according to the present invention.
Figure 2:
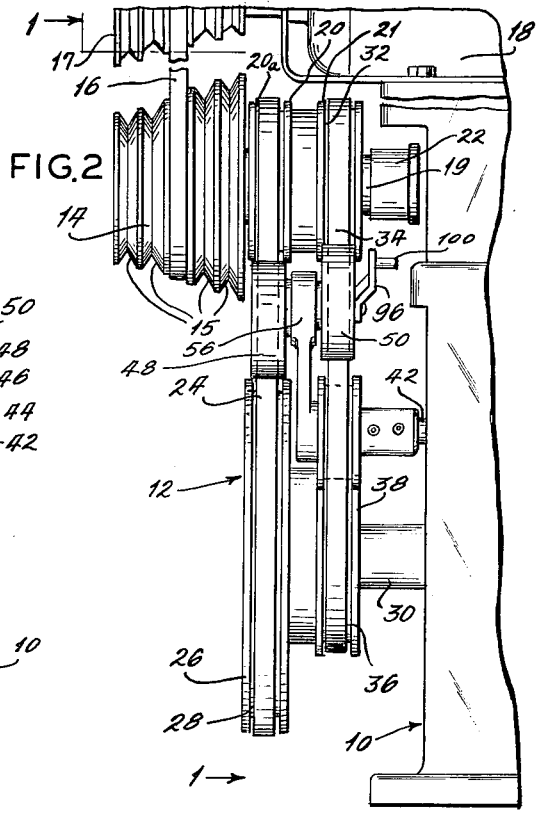
FIG. 2 is a fragmentary side elevational view of the same machine as seen from the right in FIG. 1.

Referring to the drawings by reference numbers, 10 is a machine equipped with motor driven drive means 12. In FIGS. 1 and 2 the drive means are shown for illustrative purposes as including a multi-position pulley 14 which has a plurality of grooves 15 for a motor V-belt 16. The V-belt 16 cooperates with similar but complementary grooves on a multi-position pulley 17 on motor 18 located on top of the machine 10.

The pulley 14 is mounted on a shaft 19 with two other belt pulleys 20 and 21 which will be described later. The shaft 19 is journaled by suitable bearing means at one end to an arm 22 which is pivotally connected to the machine by another shaft 23. The arm 22 is freely pivoted on the shaft 23 and makes the shaft 19 and the pulleys 14, 20 and 21 free floating for reasons which will be described more fully hereinafter.

The belt pulley 20 is the drive pulley for slow speed operation and has a flat bottom groove 20a formed therein which cooperatively receives a slow speed drive belt 24. The drive belt 24 also extends around a larger slow speed pulley 26 which is a driven pulley and which also has a similar flat bottom belt groove 28 formed therein. The slow speed driven pulley 26 is mounted on a driven shaft 30 that is connected to drive the mechanism of the machine 10.

The belt pulley 21 is the high speed drive pulley and it has a flat bottom belt groove 32 which receives a high speed belt 34. The high speed belt 34 also extends around and cooperates with a flat bottom groove 36 in a high speed driven pulley 38 also mounted on the driven shaft 30.

The purpose of the present invention is to provide means for changing the speed of the driven shaft 30 by selectively loading one of the belts 24 or 34 while simultaneously unloading the other belt. It will be noted that when the belt 24 is loaded the machine 10 will operate in a low speed range and when the belt 34 is loaded the machine will operate in a high speed range. The speed in each range can be further adjusted by changing the position of the motor belt 16 in the grooves of the pulleys 14 and 17. The means for selectively loading the belts 24 and 34 to change the speed range is important to the invention and will be described in detail hereinafter.

Figure 4:
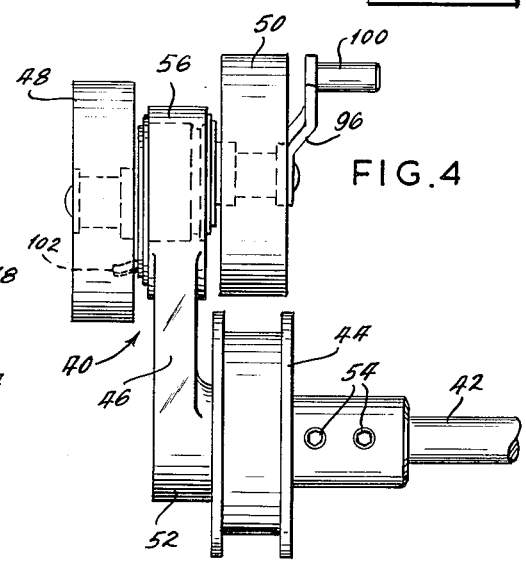
FIG. 4 is an enlarged side elevational view of the change speed device per se of FIGS. 1–3.

In FIGS. 4 and 5 there is shown an assembly 40 which is operable and selectively adjustable to load one of the belts 24 and 34. The assembly 40 includes a rotatable shaft 42 which is operatively connected for rotation to a foot pedal or similar operator member (not shown). The shaft 42 rotatably carries a stationary idler pulley 44 and an arm 46. The arm 46 rotates with the shaft 42 and carries means adjacent to its free end for engaging the belts 24 and 34. These means include two idler pulleys 48 and 50.

The arm 46 is shown in detail in FIG. 9 and includes a tubular portion 52 which receives and is fixedly attached to the shaft 42 by set screws 54 and/or a key. The arm 46 also has a portion 56 at the opposite end which is anular in shape. The portion 56 has a cylindrical bore 58 therethrough which rotatably receives a speed change adjustment member 60 shown in detail in FIGS. 5, 6, 7 and 8.

The member 60 has a cylindrical central portion 62 that is rotatably positioned in the bore 58. The portion 62 also has two annular grooves 64 and 66 formed therearound (FIGS. 5 and 6), and these grooves receive split rings 68 and 70 respectively. The groove 64 has parallel side walls between which the ring 68 is positioned, and the ring 68 slidably engages one side of the annular portion 56 of the clutch arm 46. The groove 66 is located adjacent to the opposite end of the member 62 from the groove 64 and has a tapered side wall 72 which is so located and of such a size that the split ring 70 will engage the tapered groove wall 72 and be under pressure to move down into the groove against the adjacent side of the arm portion 56. This construction reduces or eliminates end play of the member 60 but does prevent rotation thereof in the bore 58.

A hole 74 is provided in the surface of the cylindrical member 62 at an intermediate location and receives a spring 76 and a ball 78 (FIG. 8). The ball 78 moves on the surface of the bore 58 and alternatively seats in holes 80 or 81 located in preselected positions in the annular portion 56. This prevents looseness of the member 62 and positions the member 62.

A stud shaft 82 extends outwardly from the member 62 on the side thereof associated with the low speed belt 24 and rotatably receives the idler pulley 48 and its associated bearing assembly 83. The pulley 48 and its bearing assembly 83 are held in position on the stud shaft 82 by a screw 84 and a washer 85 or other suitable means. A pin 86 is also attached to an enlarged inner portion 82a of the stud shaft 82 and cooperates with two spaced pins 88 and 90 (FIGS. 5 and 9) that extend outwardly from one side of the annular arm portion 56. The pins 88 and 90 limit the rotational movement of the member 60. It should be particularly noticed that the stud shaft 82 (FIG. 7) is not centrally located on the end of the portion 62 but instead is located adjacent to the edge thereof on one side.

A similar stud shaft 92 with a similar enlarged portion or shoulder 92a extends from the opposite surface of the member 62 at a location that is not opposite from the shaft 82. The shaft 92 receives the high speed idler 50 and its associated bearing assembly 93. The shaft 92 has a pin 94 extending from its end which cooperates with a hole in a crank arm 96 which is attached to the end of the shaft 92 by screw 98 in a way to hold the idler 50 and its bearing assembly 93 thereon. The crank arm 96 has a handle 100 attached thereto which is used to rotate the member 60 in the annular arm portion 56 between positions in which the pin 86 engages or abuts one or the other pin 88 or 90. In one of these positions the low speed idler 48 will be the operative idler because it will apply greater tension to the low speed belt 24 when the shaft 42 is rotated; and in the other positions the high speed idler 50 will be operative because it will apply greater tension to the belt 34 when the shaft 42 is operated. Movement of the member 60 between the above two conditions will normally be made under conditions of no load which occurs when the pedal is not depressed.

Figure 3:
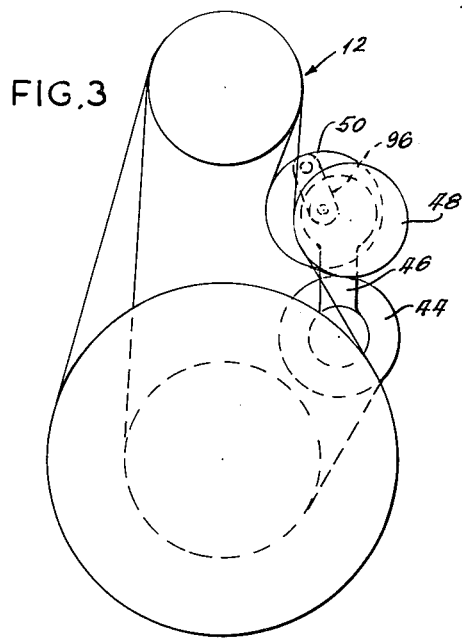
FIG. 3 is a schematic rear view of the drive means per se of FIG. 1.

When the pedal is depressed, the shaft 42 and the idler arm 46 will move counterclockwise as viewed in FIGS. 1 and 3 and this will move the idlers 48 and 50 in a direction to load the associated drive belts 24 and 34. However, in one position of the member 60 only the low speed idler 48 will tighten its associated belt 24 and in the other position only the high speed idler 50 will tighten its belt 34. Therefore operation of the member 60 will select the desired speed range, while changing the position of the motor belt 16 will produce further speed changes within the selected range.

A problem arises in shifting from one speed range to the other, however, because of the fact that the belt span between driving and driven pulleys is different from the high and low speed belts and also because of the fact that the low speed belt span is located in a different position than the high speed belt span. This is clearly apparent in FIG. 1. Because of these conditions it can be seen that different amounts of pedal travel are required to effect high and low speed belt engagement and tightening. For example, it can be seen that greater movement of the arm 46 is required to effect high speed engagement than low speed engagement. This also means that the pedal must travel further for high speed operation than for low speed operation. To overcome these undesirable conditions and to equalize the amount of pedal travel for all operations, the fixed idler 44 is provided in association with the high speed belt 34. By properly locating and selecting the fixed idler 44 and by selecting a proper belt, the subject change speed device can be made to operate for all conditions with the same amount of pedal travel.

As already noted, a change in the range of speed is effected by rotating the member 60 between alternate positions in which the pin 86 abuts one or the other of the pins 88 and 90. In these positions the spring biased ball 78 seats in one of the holes 80 or 81 in the member 56 to prevent movement and vibration of the change speed member 60. In both operation conditions, however, there is some tendency for the nonloaded belt to creep, and this can be troublesome and annoying especially in the case of the low speed belt. This is because the low speed belt 24 has greater contact with the pulley 26 and also because at high speed operation when the low speed belt is inoperative the pulley 26 is rotating at high speed. To overcome this undesirable condition, a spring steel brake member 102 is attached to the arm 46 by a screw 104 as shown in FIGS. 4, 5 and 10. The brake member 102 is located so as to be spaced from the low speed idler 48 when the machine is operating in the low speed range. However, when the machine is operating in the high speed range the brake member 102 will engage a surface 106 of the low speed idler pulley 48 and prevent the pulley from rotating. By preventing the idler 48 from rotating, the low speed belt 24 will be prevented from creeping or moving. If desired the surface 106 can be serrated for even more positive engagement thereof with the brake member 102. The two alternate positions of the low speed idler 48 and the engagement thereof by the brake member 102 are clearly illustrated in FIG. 10.

A similar brake can also be provided to prevent creeping of the high speed belt although for most purposes this has not been found necessary because at low speeds the high speed pulley 38 is going slow and also has relatively little contact with the belt 34 so that creeping is less likely.

The present change speed means has wide application and can be used on almost any device requiring more than one operating speed or range of speed. It is therefore not intended to limit the device to a particular machine or use or even to a particular embodiment.

As previously noted the shaft 19 on which the pulley 14 and the idlers 20 and 21 are located is free floating on the arm 22. This is illustrated in FIGS. 1 and 2. By so providing, the tension on the motor belt 16 is automatically equalized to the tension on the operative belt 24 or 34 which is a desirable condition. Also by having the pulley 14 free floating under non-operating conditions the motor belt 16 can be more easily moved to different grooves in the pulleys 14 and 17 because the pulley 14 will yield upwardly under non-loaded condition.

Thus there has been shown and described a novel change speed device which fulfills all of the objects and advantages sought therefor. Many changes, modifications, variations and other uses for the subject device, however, will become apparent to those skilled in the art after considering this specification and the accompanying drawings which disclose a preferred embodiment thereof. All such changes, modifications, alterations and other uses which do not depart from the spirit and scope of the invention are deemed to be covered by the invention which is limited only by the claims which follow.

What is claimed is:

1. A change speed device for a power transmission including a drive member having a pair of drive pulleys, a driven member having a pair of driven pulleys, and a drive belt cooperating with each of said drive pulleys and a corresponding one of the driven pulleys, said associated driving and driven pulleys having different relative sizes to produce different speed ratios therebetween, and means for selectively loading said drive belts to take advantage of the different speed ratios comprising a movable arm having means on one end thereof for supporting a pair of idler pulleys, said idler pulleys being movable by said arm against the corresponding drive belts in a direction to apply tension to the belts, and means for selectively shifting the position of said idler support means on the said arm to reposition said idler pulleys whereby a selected one of said idlers applies greater tension to its associated drive belt than the other when moved by the arm thereagainst.

2. The change speed device defined in claim 1 wherein said shifting means includes a rotatable member carried on said arm, said member having means for supporting the idler pulleys for rotation about spaced axes.

3. A change speed device for a power transmission comprising a drive member having a pair of axially spaced drive pulleys thereon, a driven member having a pair of spaced driven pulleys thereon, a flexible connection between each drive pulley and a corresponding driven pulley, each pair of said associated connected drive and driven pulleys having a different speed ratio, and means for selectively tensioning said flexible connections to drive a selected one of the driven pulleys, said last named means including an arm pivoted about one end and having a pair of idlers rotatably supported adjacent to the other end thereof, said idlers being aligned respectively with said flexible connections, said arm being movable between a position in which said flexible connections are loose and an operative position in which a selected one of said idlers applies tension to the associated flexible connection, and means for selectively shifting the positions of the idlers on the arm whereby one of said idlers applies greater tension to its associated flexible connection than the other idler when the arm is moved to the operative position.

4. The change speed device defined in claim 3 wherein means are provided to prevent rotation of one of said idlers in one position thereof.

5. The change speed device defined in claim 3 wherein means are provided to retain the idlers in different preselected positions on the said arm.

6. Multi-speed drive means comprising a drive shaft having a pair of spaced drive pulleys thereon and a third pulley operatively connected to a prime mover, a driven shaft having a pair of spaced driven pulleys aligned respectively with the drive pulleys, a belt connection between said aligned drive and driven pulleys, said connected pulleys having different relative sizes to produce different speeds of the driven shaft, and means for selectively applying tension to the different belt connections to change the speed of the driven shaft, said last named means including an arm having a free end movable toward or away from the belt connections, a pair of idler pulleys mounted on the free end of said arm in alignment respectively with said belt connections, and means for selectively shifting the locations of the idler pulleys on the arm so that one of said idler pulleys applies greater pressure on its associated belt connection than the other when the arm moves toward said connections.

7. The multi-speed drive defined in claim 6 wherein said third pulley is a multi-position pulley and said prime mover has a multi-position pulley operatively and selectively connectable thereto to selectively vary the speed of the drive shaft.

8. A device for changing the speed of a belt driven machine comprising drive means including a driving member, a driven member and at least two flexible drive connection means therebetween, each of said drive connection means including a pair of spaced operatively connected pulleys capable of producing a different speed for the driven member, means for selectively loading said drive connection means to effect changes in the speed of the driven member, said last named means including an arm pivoted at one end and having a pair of spaced idlers located adjacent to the opposite end, each of said idlers being aligned respectively with a different one of the two drive connection means between the driving and driven members, and means for simultaneously repositioning said idlers relative to the arm whereby a selected one of said idlers will load its associated drive connection means more than the other.

9. A change speed device for a belt driven machine comprising a drive shaft having a pair of spaced drive pulleys mounted thereon, a driven shaft connected to drive a machine and having a pair of spaced driven pulleys thereon, each of said drive pulleys being aligned with a corresponding one of the driven pulleys, a belt connecting each drive pulley with the aligned driven pulley, each connected pair of drive and driven pulleys having a different ratio of relative sizes to produce different speeds of the driven shaft, and means for selectively tensioning said belts to produce the desired speed for the driven shaft, said last named means including an arm pivotal about one end and having an opposite end with a cross bore therethrough, a member rotatably positioned in the cross bore, said member having non-aligned stud shafts extending from opposite ends thereof, an idler pulley rotatably positioned on each stud shaft and in alignment respectively with said belts, and means for selectively repositioning the rotatable member in the cross bore to thereby shift the positions of the idler pulleys relative to the end of the arm.

10. The change speed device defined in claim 9 wherein said rotatable member includes means engageable with the arm adjacent to the cross bore to retard axial movement thereof in said cross bore.

11. The change speed device defined in claim 9 wherein said rotatable member and said arm have cooperating abutment means to limit relative angular movement of said member.

12. The change speed device defined in claim 11 wherein cooperating engageable means are provided on the rotatable member and on the cross bore of the arm to reduce movement of the rotatable member in preselected positions thereof.

13. A multi-speed drive for machines and the like comprising a drive shaft having a pair of spaced drive pulleys thereon and a third pulley, a prime mover having a powered pulley spaced in a first direction from the drive shaft, belt means operatively connecting the third pulley to the powered pulley, a driven shaft positioned in a direction substantially opposite from the powered pulley relative to the drive shaft and having a pair of spaced driven pulleys thereon in alignment respectively with the drive pulleys, a belt connection between each of said drive pulleys and the aligned driven pulleys, said connected pulleys having different relative sizes in order to produce different speeds of the driven shaft, means for selectively applying tension to the different belt connections between the drive and driven pulleys to adjust the speed of the driven shaft, said last named means including an arm having a free end movable toward or away from the belt connections, a pair of idlers mounted on the free end of the arm in alignment respectively with said belt connections, means for selectively shifting the locations of the idlers on the arm so that one of said idlers applies greater tension on its associated belt connection than the other idler when the arm is moved toward said belt connections, and means movably supporting the drive shaft whereby said drive shaft moves to a position equalizing the tension on the belt connection between the third pulley and the powered pulley and the belt connection between the drive and driven pulley having the greater tension thereon.

14. A belt drive device for a machine or the like comprising a prime mover including a power pulley, a drive shaft spaced from the power pulley and having a drive pulley thereon, a belt connection between the power pulley and the drive pulley, a second pulley on the drive shaft, a driven shaft spaced from the drive shaft on the opposite side thereof from the power pulley, a driven pulley on said driven shaft, a belt connection between the driven pulley and said second pulley on the drive shaft, means mounting the drive shaft for movement back and forth between the power pulley and the driven shaft, and means for applying tension to one of said belt connections whereby said drive shaft moves to a position equalizing the applied tension between the belt connections to the power pulley and to the driven pulleys.

15. A change speed device for a power transmission comprising a drive member having a pair of axially spaced drive pulleys thereon, a driven member having a pair of spaced driven pulleys thereon, a flexible connection between each drive pulley and a corresponding driven pulley, each pair of said associated connected drive and driven pulleys having a different speed ratio, and means for selectively tensioning said flexible connections to drive a selected one of the driven pulleys, said last named means including an arm having a pair of idlers rotatably supported adjacent to one end thereof, said idlers being aligned respectively with said flexible connections, said arm being movable between an inoperative position away from the flexible connections and an operative position in which a selected one of said idlers applies tension to the associated flexible connection, means for selectively shifting the positions of the idlers on the arm whereby one of said idlers applies greater tension to its associated flexible connection than the other idler when the arm is moved to the operative position, and a non-movable idler engaged with one of said flexible connections to equalize movement of the clutch arm under the different selected operating conditions.

16. Multi-speed drive means comprising a drive shaft having a pair of spaced drive pulleys thereon and a third pulley operatively connected to a prime mover, a driven shaft having a pair of spaced driven pulleys aligned respectively with the drive pulleys, a belt connection between said aligned drive and driven pulleys, said connected pulleys having different relative sizes to produce different speeds of the driven shaft, and means for selectively applying tension to the different belt connections to change the speed of the driven shaft, said last named means including an arm having a free end movable toward or away from the belt connections, a pair of idler pulleys mounted on the free end of said arm in alignment respectively with said belt connections, means for selectively shifting the locations of the idler pulleys on the arm so that one of said idler pulleys applies greater pressure on its associated belt connection than the other when the arm moves toward said connections, and take-up means engaged with one of said belt connections to relocate said connection to equalize movement of the free end of the arm required to tension the belt connections for all positions of the idler pulleys.

References Cited by the Examiner
UNITED STATES PATENTS

| | | |
|---|---|---|
| 2,473,963 | 6/49 | McKelvey. |
| 2,791,910 | 5/57 | Eckley _____ 74—242.1 |
| 2,883,869 | 4/59 | Schenkengel _____ 74—217 |
| 2,948,374 | 8/60 | Husband _____ 74—217 X |
| 2,995,944 | 8/61 | Ciaccio _____ 74—217 |

DON A. WAITE, *Primary Examiner.*